Nov. 8, 1960   J. N. GLADDEN ET AL   2,959,450
POWER BRAKING SYSTEM AND CONTROL UNIT THEREFOR
Filed Oct. 8, 1956   2 Sheets-Sheet 1
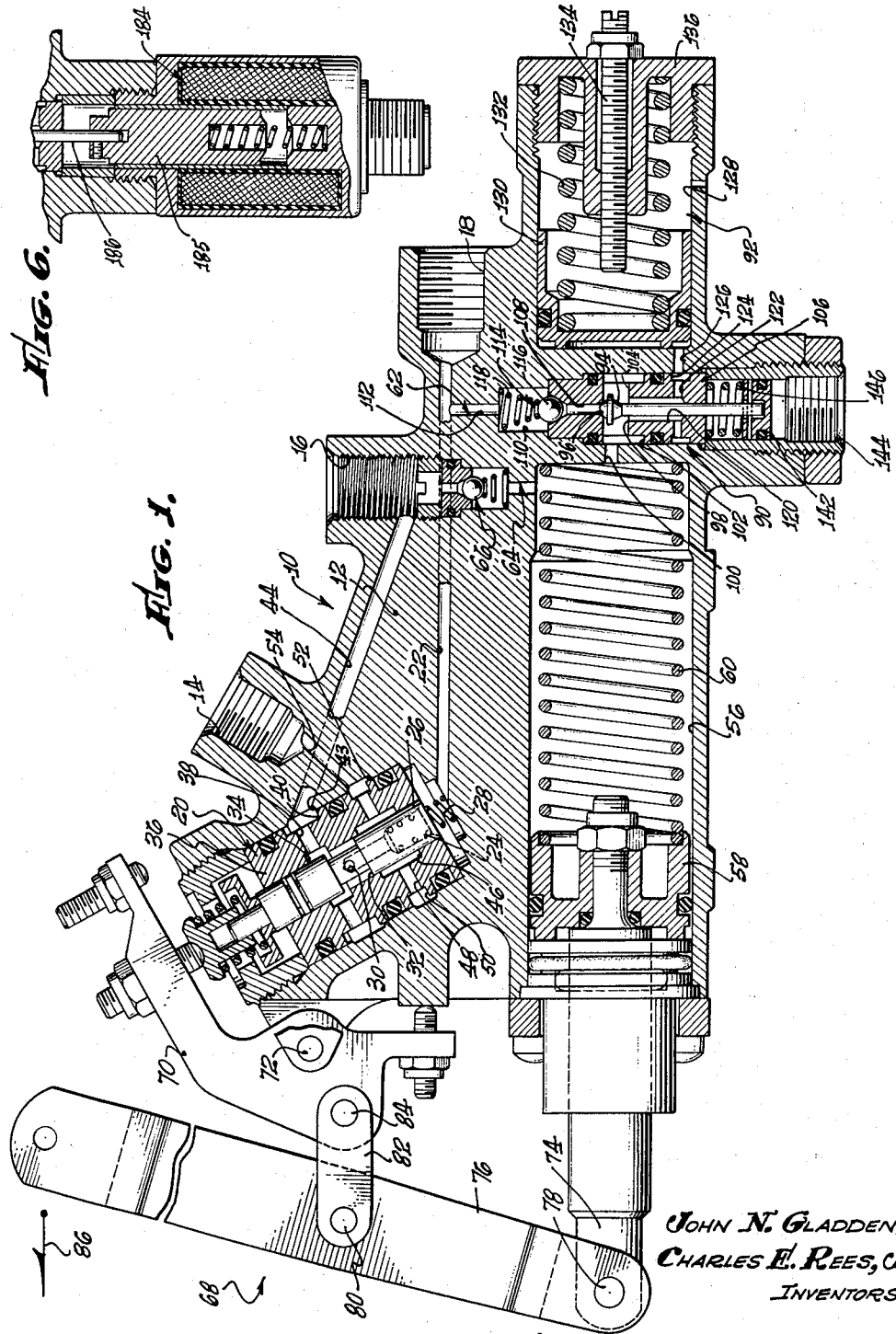
JOHN N. GLADDEN,
CHARLES E. REES, JR.,
INVENTORS.
By THEIR ATTORNEYS
HARRIS, KIECH, FOSTER & HARRIS.

Nov. 8, 1960  J. N. GLADDEN ET AL  2,959,450
POWER BRAKING SYSTEM AND CONTROL UNIT THEREFOR
Filed Oct. 8, 1956  2 Sheets-Sheet 2
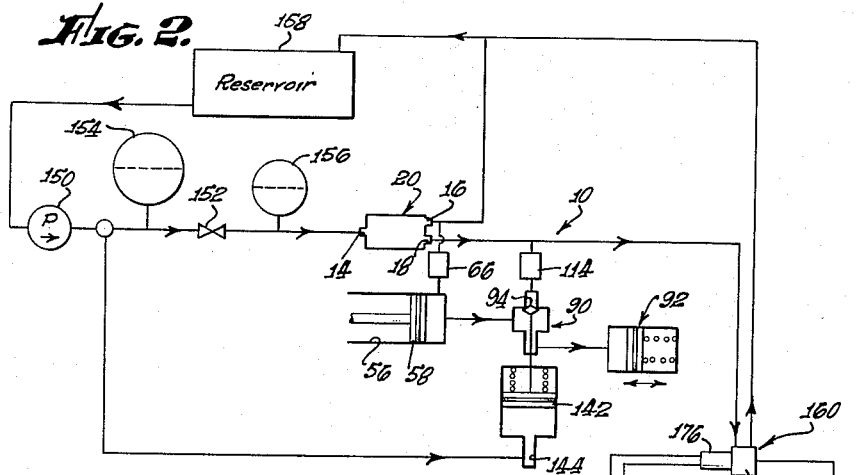
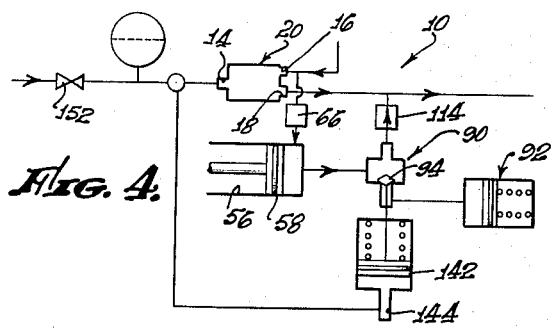
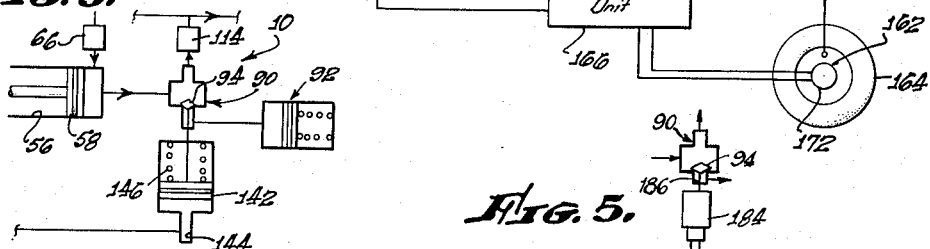
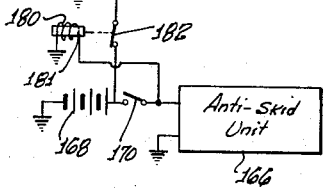
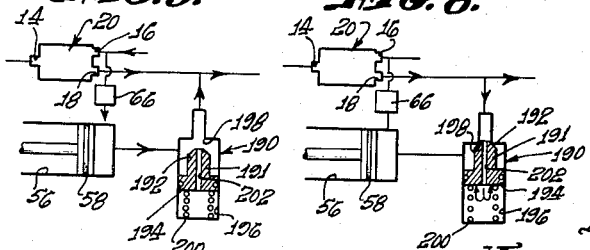
JOHN N. GLADDEN,
CHARLES E. REES, JR.,
INVENTORS.
By their Attorneys.
HARRIS, KIECH, FOSTER & HARRIS.

United States Patent Office 2,959,450
Patented Nov. 8, 1960

2,959,450

POWER BRAKING SYSTEM AND CONTROL UNIT THEREFOR

John N. Gladden and Charles E. Rees, Jr., Glendale, Calif., assignors to Gladden Products Corporation, Glendale, Calif., a corporation of California Filed Oct. 8, 1956, Ser. No. 614,466

11 Claims. (Cl. 303—24)

The present invention relates to an improved power braking system and to an improved control unit having particular utility in such a system, although it may have other utility as well.

There is a prior power braking system for airplanes which includes a control unit having a pressure port connected to the outlet of a pump, a return port connected to a reservoir which supplies operating fluid to the inlet of the pump, and an operating port which is connected to the brakes incorporated in the wheels of the airplane. The control unit also includes control valve means movable between an inoperative position wherein it connects the operating port to the return port and an operative position wherein it connects the operating port to the pressure port, spent operating fluid being returned from the brakes to the reservoir when the control valve means is in its inoperative position and operating fluid under pressure being delivered from the pump to the brakes when the control valve means is in its operative position. This prior control unit also includes cylinder means connected to the operating port and having therein piston means movable to an operative position to deliver operating fluid under pressure to the brakes, a common actuating means for moving the control valve means and the piston means toward the respective operative positions being provided. Conventionally, such actuating means is connected to a pedal operable by the foot of the pilot of the airplane. Control units of this nature are disclosed is an issued patent and in a co-pending patent application of John N. Gladden, one of the inventors hereof, the issued patent being No. 2,676,465, granted April 27, 1954, and the co-pending application being Serial No. 548,059, filed November 21, 1955, now Patent No. 2,847,829. Reference is hereby made to such issued patent and co-pending application for a complete disclosure of prior control units of the general nature hereinbefore discussed.

With a power braking system incorporating such a prior control unit, the operator of the system senses the pressure applied to the brakes since this pressure acts on the piston means of the control unit, which piston means is connected to the pedal, or other manual actuating device, through the common actuating means for the piston means and the control valve means. Thus, the operator of the system is provided with the highly desirable "feel" which some power braking systems lack.

There also exists a prior power braking system incorporating a control unit of the foregoing nature which includes dump valve means interposed between the operating port of the control unit and the brakes for connecting each brake either to the operating port, or to the reservoir. Such prior system further includes means responsive to skidding of the wheel associated with each brake for moving a valve element of the dump valve means to a position such that it cuts off communication between the brake and the operating port and establishes communication between the brake and the reservoir, thereby interrupting the application of the brake to prevent further skidding of the wheel. This anti-skid means has a cyclic action and alternately applies and releases the brake many times per second when the brake is applied to an extent sufficient to produce skidding. The operation of the anti-skid means is such as to keep the wheel constantly on the verge of skidding when the brake is applied to an extent sufficient to tend to produce skidding, thereby achieving maximum braking effectiveness. Actually, under the conditions outlined, the wheel does skid slightly to activate the anti-skid means each time the dump valve means connects the brake to the operating port since this is a feedback system, but the amount of wheel skidding is very small.

As will be apparent, with such a prior system, as thus far described, the pressure applied to the brake by the dump valve means varies between the reservoir pressure and the pump outlet pressure, which results in extremely rough operation since the brake is either off or full on. To smooth out the operation of the brake under such conditions, it has previously been proposed to place a restrictor in the system between the pump outlet and the pressure port of the control unit. The restrictor throttles the flow of operating fluid under pressure from the outlet of the pump to the brake through the control unit and the dump valve means, thereby causing the operating fluid pressure available at the brake to decay from full pump-outlet pressure to a lower, residual or "roll-out" pressure. As the operating fluid pressure available at the brake decays to the "roll-out" pressure in this manner, the amplitude of pressure fluctuation at the brake, as the dump valve means alternately connects the brake to the operating port and the reservoir, decreases to smooth out the operation of the brake. Ultimately, the operating fluid pressure available at the brake decays to and remains at the "roll-out" pressure, at which time the brake is applied almost continuously with the wheel on the verge of skidding, the dump valve means now operating only relatively infrequently, whenever the wheel tends to skid, to connect the brake to the reservoir. Thus, the airplane rolls to a stop with a minimum of wheel skidding, due to the interaction of the restrictor and the dump valve means in maintaining the operating fluid pressure applied to each brake at the "roll-out" value.

While the foregoing power braking system performs the function desired of it satisfactorily in most respects, it has one serious disadvantage in that the decaying operating fluid pressure applied to the brake through the described interaction between the restrictor and the dump valve means is also applied to the piston means to which the pedal, or other manual actuating element, is connected. Consequently, each time the dump valve means connects the brake to the reservoir, it also connects the cylinder means of the control unit to the reservoir, which permits the piston means in such cylinder means to move toward that end of the cylinder means which is connected to the operating port, such movement resulting from the pressure applied to the pedal by the pilot. After a relatively few cycles of operation of the dump valve means, the piston means of the control unit moves far enough to permit the pedal to move to the limit of its travel, such pedal movement occurring in a step-by-step manner, in synchronism with the cyclic operation of the dump valve means, with what is best described as a "ratcheting" effect. Of course, such movement of the pedal to the end of its travel has no effect on the braking action since the control valve means in the control unit remains in its operative position to connect the pressure port of the control unit to the brake through the dump valve means. However, the movement of the pedal to the limit of its travel in this fashion has an extremely disconcerting effect on pilots since, for reasons which will be apparent, it produces the sensation of a brake failure and has resulted in accidents in instances where pilots have abandoned use of the braking system in the belief that it was inoperative.

A primary object of the present invention is to overcome the foregoing difficulties of such prior braking systems and control units by providing a braking system and control unit having means for preventing "ratcheting" of the pedal, or other manual actuating element, to the end of its travel in response to cyclic operation of the dump valve means.

More particularly, an important object of the invention is to provide selector valve means for disconnecting the cylinder means in the control unit from the operating port under normal operating conditions so that the piston means of the control unit cannot move toward the outlet end of the cylinder means in the step-by-step manner described even though the dump valve means is alternately connecting the brake to the operating port and to the reservoir. Thus, even though the restrictor and dump valve means are interacting to prevent skidding and to permit the operating fluid pressure at the brake to decay to the desired "roll-out" value, the provision of such selector valve means for disconnecting the cylinder means of the control unit from the operating port prevents the pilot from sensing the intermittent application of the brakes, and thus avoids the consequences hereinbefore discussed, which is an important feature of the invention.

Another object of the invention is to provide a selector valve means which disconnects the cylinder means of the control unit from the operating port under normal operating conditions, but which reconnects the cylinder means to the operating port in the event of any failure of the supply of operating fluid to the pressure port. When this occurs, the brakes can no longer be energized in the manner hereinbefore discussed and, under such conditions, the pilot, by pumping the brake pedal, can apply the brakes manually. In other words, by pumping the brake pedal, the pilot reciprocates the piston means of the control unit in its cylinder means to deliver successive charges of operating fluid to the brakes in a manner characteristic of conventional master cylinders, the control unit providing fluid communication between the cylinder means and the reservoir through an inlet check valve for this purpose. It will be understood that such a pumping action is required only if it is necessary to charge the lines leading to the brakes with operating fluid, it merely being necessary to apply a steady operating force to the brake pedal to apply the brakes manually if the system between the brakes and the cylinder means is fully charged with operating fluid.

Thus, it will be seen that providing a selector valve means for disconnecting the cylinder means of the control unit from the operating port when operating pressure is available, and for connecting the cylinder means to the operating port when such operating fluid pressure is not available, eliminates the objectionable "ratcheting" of the brake pedal to the limit of its travel in response to the interaction between the restrictor and the dump valve means when operating fluid pressure is available, and permits manual application of the brakes when operating fluid pressure is not available, which are important features of the invention.

Another important object of the invention is to provide a control unit having an accumulator to which the cylinder means of the control unit is connected by the selector valve means when such selector valve means disconnects the cylinder means from the operating port. Thus, under normal operating conditions, the cylinder means of the control unit is connected to the accumulator to provide resilience in the system, such resilience permitting movement of the brake pedal toward the limit of its travel with progressively increasing resistance to provide an artificial "feel" whenever the cylinder means is disconnected from the operating port, which is an important feature of the invention.

Another object is to provide a control unit wherein the selector valve means for connecting the cylinder means to either the operating port or the accumulator is fluid operated and is responsive to the operating fluid pressure between the pressure port and the pump outlet, being responsive either to the operating fluid pressure between the pump outlet and the restrictor, or to the operating fluid pressure between the restrictor and the pressure port.

Another object is to provide a control unit wherein the selector valve means is electrically operated and is responsive either to the operating fluid pressure between the pump outlet and the restrictor, or to the operating fluid pressure between the restrictor and the pressure port.

Another object is to provide a selector valve means which is electrically operated to disconnect the cylinder means from the operating port whenever the anti-skid means discussed is in operation.

Still another object is to provide a control unit wherein the selector valve means is fluid operated and is responsive to fluid pressure in the operating port, the selector valve means in this instance disconnecting the cylinder means from the operating port as long as the fluid pressure in the operating port is above a predetermined value, corresponding to normal operating conditions, and connecting the cylinder means to the operating port whenever the fluid pressure in the operating port falls below such predetermined value as the result of failure of the source of operating fluid pressure, such as the pump, or any of the lines associated therewith.

The foregoing objects, advantages, features and results of the present invention, together with various other objects, advantages, features and results thereof which will be quite evident to those skilled in the art, may be attained with the exemplary embodiments of the invention hereinafter described in detail and illustrated in the accompanying drawings, in which:

Fig. 1 is a sectional view of one embodiment of a control unit of the invention;

Fig. 2 is a diagrammatic view of a power braking system incorporating therein the control unit of Fig. 1;

Fig. 3 is a fragmentary diagrammatic view duplicating a portion of Fig. 2, but illustrating various components in other operating positions;

Fig. 4 is a fragmentary diagrammatic view similar to a portion of Fig. 2, but illustrating an alternative embodiment of the invention;

Fig. 5 is a fragmentary diagrammatic view illustrating still another embodiment of the invention;

Fig. 6 is a fragmentary sectional view illustrating an operating means for a selector valve means of the embodiments illustrated in Figs. 5 and 7;

Fig. 7 is a fragmentary diagrammatic view of still another embodiment of the invention employing the selector-valve-means actuating means of Fig. 6; and Figs. 8 and 9 are fragmentary diagrammatic views of a further embodiment of the invention with various components in different operating positions.

Referring to Fig. 1 of the drawings, illustrated therein is a control unit 10 of the invention which is similar in most respects to the control units disclosed in the aforementioned issued patent and co-pending patent application. Consequently, those portions of the control unit 10 which are similar to corresponding portions of the control units of such patent and application will be described only briefly herein.

The control unit 10 includes a housing 12 having an inlet or pressure port 14 adapted to be connected to a source of operating fluid under pressure, such as a pump, an outlet or return port 16 adapted to be connected to a point of disposal for spent operating fluid, such as a reservoir communicating with the inlet of the pump, and an intermediate or operating port 18 adapted to be connected to a device, such as a brake, to be controlled by the unit 10. Within the housing 12 is a control valve means 20 movable between an inoperative position, shown in Fig. 1 of the drawings, and an operative position. When the control valve means 20 is in the inoperative position shown, it connects the operating port 18 to the return port 16 through a passage 22 in the housing 12, an axial passage 24 in a control valve element 26 which is biased toward its inoperative position by a compression spring 28, a port 30 in the control valve element, an external annular groove 32 in the control valve element, an internal annular groove 34 in a control valve body 36, radial ports 38 in the control valve body, an external annular groove 40 in the control valve body, an annular groove 43 in the housing 12, and a passage 44 in the housing. When the control valve means 20 is in its operative position, it connects the operating port 18 to the pressure port 14 through the passage 22 in the housing 12, the passage 24, the port 30 and the annular groove 32 in the control valve element 26, an internal annular groove 46, radial ports 48 and an external annular groove 50 in the control valve body 36, and an annular groove 52 and a passage 54 in the housing.

The housing 12 is provided therein with a cylinder means or cylinder 56 containing a piston means or piston 58 biased toward one end of the cylinder by a compression spring 60. The other end of the cylinder 56 communicates with the operating port 18 through a passage means 62 which will be discussed in more detail hereinafter. Such other end of the cylinder 56 also communicates with the return port 16 through a passage means 64 having therein an inlet check valve or check valve means 66 which permits flow of operating fluid from the return port 16 into the cylinder 56, but which prevents flow in the opposite direction.

The control unit 10 includes an actuating means 68 for moving the control valve means 20 and the piston means 58 toward their respective operative positions in unison, movement of the piston means toward its operative position being regarded as movement toward the end of the cylinder 56 with which the two passage means 62 and 64 communicate. The actuating means 68 includes a lever 70 pivotally connected to the housing 12 at 72 and acting on the control valve element 26, this control valve element being moved into its operative position whenever the lever 70 is rotated in the clockwise direction. The piston 58 is provided with a piston rod 74 to which an actuating lever 76 is pivotally connected at 78, this actuating lever also being pivotally connected, at 80, to a link 82 which, in turn, is pivotally connected, at 84, to the lever 70. As will be apparent, whenever a force is applied to the actuating lever 76 as indicated by the arrow 86, both the control valve element 26 and the piston 58 are moved toward their respective operative positions, whereby the control valve element connects the operating port 18 to the pressure port 14, and whereby the piston tends to displace fluid from the cylinder 56 to the operating port through the passage means 62, the inlet check valve 66 preventing outflow through the passage means 64 to the return port 16. Thus, as will be apparent, when the passage means 62 is open to provide communication between the cylinder 56 and the operating port 18, the fluid pressure in the operating port is applied to the piston to provide the desired "feel." In other words, the operator of the control unit 10 always senses the pressure developed in the operating port 18 by movement of the control valve element 26 to its operative position to establish fluid communication between the pressure port 14 and the operating port.

In the event that the operating fluid pressure at the pressure port 14 fails for any reason, due, for example, to failure of the pump, or other source of operating fluid pressure, or due to failure of intervening connecting lines, or the like, pressure may be developed manually in the operating port 18 when the passage means 62 is opened by the manual actuating force applied to the actuating lever 76 as indicated by the arrow 86. As will be apparent, movement of the piston 58 toward the right, as viewed in Fig. 1 of the drawings, displaces fluid from the cylinder 56 through the passage means 62 to the operating port 18, outflow through the passage means 64 to the return port 16 being prevented by the inlet check valve means 66. Outflow through the control valve means 20 to the pressure port 14 under such conditions is prevented in any suitable manner, as by placing a check valve, not shown, in a line connected to the pressure port 14, or by employing a pump, not shown, equipped with a check valve for preventing reverse flow therethrough. It will also be apparent that the piston 58 may be operated with a pumping action to completely charge any system to which the operating port 18 is connected with operating fluid, the check valve 66 opening each time the piston 58 is moved to the left, as viewed in Fig. 1 of the drawings, by the spring 60 to admit additional fluid into the cylinder 56 from a reservoir, not shown in Fig. 1 of the drawings, to which the return port 16 is connected.

Thus, the control unit 10 acts as a power unit as long as operating fluid under pressure is available at the pressure port 14, and acts as a manual master cylinder in the event of failure of the operating fluid pressure at the pressure port.

Considering the passage means 62, it is controlled by a selector valve means 90 which connects the cylinder 56 to either the operating port 18, or an accumulator 92. This selector valve means 90 includes a selector valve 94 which is engageable either with a valve seat 96, or a valve seat 98, engagement of the selector valve 94 with the valve seat 96 preventing communication between the cylinder 56 and the operating port 18, and engagement of the selector valve with the valve seat 98 preventing communication between the cylinder and the accumulator 92. When the selector valve 94 is in engagement with the valve seat 98, communication between the cylinder 56 and the operating port 18 is provided by the passage means 62, which includes a port 100 in the housing 12, an external annular groove 102 and radial ports 104 in a selector valve body 106, an axial passage 108 in the selector valve body, a bore 110 in the housing 12, and a passage 112 in the housing, the passage 112 communicating with the passage 22 leading to the operating port 18. In the bore 110 is an outlet check valve or check valve means 114 comprising a ball valve 116 biased into engagement with the selector valve body 106, to close the passage 108, by a compression spring 118. Thus, when the selector valve 94 is in engagement with the valve seat 98, operating fluid may flow from the cylinder 56 to the operating port 18, fluid flow in the opposite direction through the passage means 62 being prevented by the outlet check valve 114.

When the selector valve 94 is seated on the seat 96, communication between the cylinder 56 and the accumulator 92 is established through the port 100, the groove 102, the ports 104, a passage 120, ports 122 and an external annular groove 124 in the selector valve body 106, and a passage 126 in the housing 12. The accumulator 92 comprises a cylinder 128 having therein a piston 130 which is biased by a compression spring 132 in a direction tending to oppose the flow of operating fluid from the cylinder 56 to the cylinder 128 in response to movement of the piston 58 toward the right, as viewed in Fig. 1 of the drawings. As will be apparent, when the accumulator 92 is in communication with the cylinder 56, the operating fluid pressure at the operating port 18 no longer acts on the piston 58 to provide the operator of the control unit 10 with a "feel" directly proportional to the operating-port pressure. However, under such conditions, the accumulator 92 provides an artificial "feel" which progressively increases as a progressively greater force is applied to the actuating lever 76 due to progressive compression of the accumulator spring 132. The amount of travel of the piston 58 which is permitted by the accumulator 92 may be varied by means of an adjustable stop 134 which is engaged by the accumulator piston 130 after a predetermined amount of travel thereof, the stop 134 being thready mounted in a closure 136 threaded into one end of the accumulator cylinder 128.

Thus, it will be apparent that when the selector valve means 90 connects the cylinder 56 to the accumulator 92, the manual force applied to the actuating lever 76 as indicated by the arrow 86 is opposed by the spring 60 and the accumulator spring 132 to provide an artificial "feel." However, when the selector valve means 90 connects the cylinder 56 to the operating port 18, the operator of the control unit 10 is provided with an actual "feel" directly proportional to the operating fluid pressure in the operating port 18.

In the embodiment under consideration, the selector valve means 90 is fluid operated, the selector valve 94 having connected thereto an actuating means comprising a piston 142 which is adapted to move the selector valve out of engagement with the valve seat 98 into engagement with the valve seat 96 whenever pressure is applied to one side of the piston through a control port 144 in the housing 12. In other words, whenever sufficient pressure exists in the control port 144, the selector valve means 90 cuts off communication between the cylinder 56 and the operating port 18, and establishes communication between this cylinder and the accumulator 92. In the absence of such pressure in the control port 144, a spring 146 moves the selector valve 94 out of engagement with the valve seat 96 into engagement with the valve seat 98. Under such conditions, communication between the cylinder 56 and the operating port 18 is established, and communication between this cylinder and the accumulator 92 is cut off.

The foregoing control unit 10 constitutes an embodiment of the invention which may be utilized in various ways for various purposes. For example, if the control port 144 is placed in fluid communication with the pressure port 14, which then acts as a remote fluid pressure signal source controlling the selector valve 94, the selector valve means 90 will establish communication between the cylinder 56 and the accumulator 92 as long as the pressure in the pressure port 14 is above a predetermined value. Under such conditions, the control unit 10 operates as a straight power device, an operating force applied to the actuating lever 76 as indicated by the arrow 86 resulting in connecting the pressure port 14 to the operating port 18 through the control valve means 20, and being opposed by the accumulator 92, which provides an artificial "feel." In this situation, the amount of travel of a pedal, or other manual actuating element, connected to the actuating lever 76 is limited by the stop 134, which may be adjusted to vary the amount of such pedal travel. However, if the pressure port 14 drops below a predetermined value for any reason, due, for example, to some failure upstream from the pressure port, the selector valve means 90 immediately disconnects the cylinder 56 from the accumulator 92 and connects it to the operating port 18, whereupon the control unit 10 becomes a manual device operating much like a conventional master cylinder, it being possible to deliver fluid from the cylinder 56 to the operating port 18 under these circumstances by applying steady pressure to a pedal, or other manual actuating element, connected to the actuating lever 76, or by pumping such pedal.

Turning now to Figs. 2 and 3 of the drawings, the control unit 10 is illustrated therein in segmentary, diagrammatic form, only the essential components thereof being shown and these being shown schematically. Figs. 2 and 3 of the drawings illustrate a power braking system in which the control unit 10 is incorporated, this system including a pump 150 the outlet of which is connected to the pressure port 14 through a restrictor 152. Gas-liquid accumulators 154 and 156 are interposed between the pump 150 and the restrictor 152 and between the restrictor and the pressure port 14, respectively, to smooth out pressure fluctuations. The inlet of the pump 150 is connected to a reservoir 158, to which the return port 16 is connected. The operating port 18 is connected to a dump valve means 160, which is also connected to the reservoir 158 and to a brake 162 associated with a wheel 164. As hereinbefore discussed in detail, the dump valve means 160 is adapted to connect the brake 162 either to the operating port 18 to energize the brake, or to the reservoir 158 to de-energize the brake. The system illustrated in Figs. 2 and 3 includes an anti-skid means or unit 166 powered by a battery 168 and controlled by a switch 170, the anti-skid means being connected to a skid sensing means 172 at the wheel. When skidding of the wheel 164 is sensed by the skid-sensing means 172, it activates the anti-skid means 166 to cause the dump valve means 160 to connect the brake 162 to the reservoir 158 and to disconnect it from the operating port 18, thereby dumping the pressure applied to the brake to release the brake. The dump valve means 160 may include a dump valve 174 operated by a solenoid 176 controlled by the anti-skid means 166.

The control port 144 of the control unit 10 is connected to the outlet of the pump 150 between it and the restrictor 152. Consequently, as long as the pump 150 is delivering operating fluid above a predetermined pressure, the piston 142 maintains the selector valve means 90 in a position to establish communication between the cylinder 56 and the accumulator 92, and to cut off communication between the cylinder 56 and the brake 162.

Considering the operation of the power braking system illustrated in Figs. 2 and 3 of the drawings, it will be assumed that the pump 150 is delivering operating fluid to the pressure port 14 at a pressure sufficient to cause the selector valve means 90 to connect the cylinder 56 to the accumulator 92, as shown in Fig. 2, this being accomplished by the connection shown between the pump and the control port 144, which causes the pump outlet to act as a remote signal source controlling the selector valve 94. Assume now that the operator, e.g., the pilot of the vehicle, e.g., an airplane, in which this power braking system is installed, applies an actuating force to the actuating lever 76 in the direction of the arrow 86 by means of a brake pedal, not shown, connected to such actuating lever. This action moves both the control valve means 20 and the piston 58 toward their respective operative positions, such movement of the piston being opposed by the accumulator 92, since the selector valve means 90 connects the cylinder 56 to the accumulator, to provide the pilot with an artificial "feel" indicative of the braking force he is applying. The movement of the control valve means 20 to its operative position disconnects the brake 162 from the return port 16, and connects it to the operating port 18, whereby pressure is applied to the brake 162 to energize it.

If the braking force applied to the pedal by the pilot is sufficiently high, the control valve means 20 will be moved toward its operative position to an extent sufficient to cause the wheel 164 to skid. This skidding is sensed by the means 172, which relays a signal to the anti-skid unit 166. The latter then energizes the solenoid 176 of the dump valve means 160, whereby the dump valve means connects the brake 162 to the reservoir 158, at the same time disconnecting it from the operating port 18. This dumping of the pressure applied to the brake 162 releases the brake and stops the skid and, as soon as the skid stops, the anti-skid unit 166 deenergizes the solenoid 176 to permit the dump valve means 160 to reconnect the brake 162 to the operating port 18, thereby reapplying the brake. Thus, as the wheel 164 alternately skids and rolls, the dump valve means 160 alternately connects the brake 162 to the reservoir 158 and to the operating port 18. As this alternate application of pressure to and dumping of the pressure applied to the brake 162 continues, the pressure available at the operating port 18 progressively decays due to the action of the restrictor 152, the capacity of this restrictor being such that it permits operating fluid to flow from the pump 150 to the control unit 10 at a rate less than the rate at which operating fluid is dumped back into the reservoir 158 by the dump valve means 160. Consequently, the pressure available to set the brake 162 progressively diminishes until it eventually decays to a residual, "roll-out" value sufficient to maintain the wheel 164 just on the verge of skidding through the landing roll of the airplane. Thus, the interaction of the restrictor 152 and the dump valve means 160 avoids constant energization and de-energization of the brake 162 throughout the entire landing roll, and quickly causes the pressure available at the brake 162 to decay to a "roll-out" value just sufficient to secure maximum braking effectiveness.

As the foregoing is taking place, the cylinder 56 is isolated from the brake 162 because of the fact that the selector valve means 90 connects it to the accumulator 92, instead of to the brake 162. Consequently, the pilot of the airplane is completely unaware of the activity of the dump valve means 160, and his foot is subjected to a steady reactive force resulting from the artificial "feel" imposed by the accumulator. Were it not for the action of the selector valve means 90 in disconnecting the cylinder 56 from the brake 162 under the conditions hereinbefore outlined, the periodic dumping of the pressure at the brake would result in periodic discharging of fluid from the cylinder 56 into the lines leading to the dump valve means 160 and the brake 162. This periodic dumping of fluid from the cylinder 56 would result in "ratcheting" of the brake pedal to the limit of its travel, with a disconcerting effect on the pilot and potentially dangerous consequences. However, since the selector valve means 90 does isolate the pilot from the action of the dump valve means 160, the piston 58 remains fixed in a position determined by the pressure applied to the brake pedal by the pilot so that, insofar as the pilot's sensations are concerned, a steady pressure is being applied to the brake 162, which is an important feature of the invention.

Turning now to Fig. 3 of the drawings, if the operating fluid pressure developed by the pump 150 is interrupted for any reason, as by a pump failure, or the like, this pressure failure is transmitted to the control port 144, whereupon the spring 146 causes the selector valve means 90 to disconnect the cylinder 56 from the accumulator 92 and to connect it to the operating port 18, and thus to the brake 162 through the dump valve means 160. Under these conditions, the fluid pressure developed in the cylinder 56 by an application of a braking force to the brake pedal is communicated not to the accumulator 92, but to the brake 162 to apply the brake. If the lines of the system between the operating port 18 and the brake 162 are fully charged with operating fluid, then a simple application of pressure to the brake pedal results in energization of the brake 162. However, if the lines are not fully charged with operating fluid, it is merely necessary for the pilot to pump the brake pedal, this pumping action being communicated to the piston 58, which alternately draws fluid into the cylinder 56 from the reservoir 158 through the inlet check valve 66 and discharges operating fluid into the lines leading to the brake 162 through the selector valve means 90 and the outlet check valve 114. As soon as the pumping action has resulted in the development of sufficient pressure to energize the brake 162, the pumping action may be terminated and a steady pressure applied to the brake pedal. Thus, the control unit 10, under these conditions, operates in much the same manner as a standard master cylinder. It will be understood that if the pilot develops an excessive pressure at the brake 162 sufficient to produce skidding of the wheel 164 during manual operation of the control unit 10, the dump valve means 160 will operate in the manner hereinbefore discussed to prevent skidding, whereupon it is necessary for the pilot to pump the brake pedal to restore the braking pressure.

Thus, the present invention provides a power braking system which prevents skidding of the wheel 164 without feeding any undesirable signal back to the pilot during normal operation wherein the control unit is operating as a straight power device. In other words, even though the dump valve means 160 is periodically energizing and de-energizing the brake 162 to prevent skidding and to reduce the pressure developed at the brake to the "roll-out" value mentioned, the pilot is completely unaware of this activity, his only sensation being that he is applying a steady pressure to the brake pedal because of the fact that the braking force applied by the pilot is being opposed by the accumulator 92. In the event of a failure of the operating fluid pressure source, the selector valve means 90 disconnects the cylinder 56 from the accumulator 92 and connects it to the brake 162, whereupon the control unit 10 may be operated manually in much the same manner as a conventional master cylinder is operated.

Referring to Fig. 4 of the drawings, illustrated therein is a power braking system which is identical to that illustrated in Figs. 2 and 3, except that the control port 144 is connected to the outlet of the pump 150 downstream from the restrictor 152, i.e., between the restrictor 152 and the pressure port 14, thereby providing a different remote signal source for controlling the selector valve 94. In this case, the selector valve means 90 responds to the residual or "roll-out" pressure and, if it is desired to make the response of the selector valve means comparable to its response in the system of Figs. 2 and 3, this may be accomplished readily by making the piston 142 larger so that a greater force is applied to the selector valve 94 even though the pressure applied to the piston 142 may be smaller.

Referring to Fig. 5 of the drawings, illustrated therein is a power braking system wherein the coil of an electromagnet 180 is connected across the main switch 170 associated with the anti-skid means 166. The armature 181 of this electromagnet is connected to a switch 182 in series with the battery 168 and a solenoid 184, the armature 185 of this solenoid, shown in Fig. 6 of the drawings, being connected to a valve stem 186, Figs. 5 and 6, having the selector valve 94 connected thereto. With this system, the switch 170 acts as a remote signal source controlling the selector valve 94 so that whenever the anti-skid means 166 is inoperative due to opening of the switch 170, the electromagnet 180 is de-energized to close the switch 182, thereby energizing the solenoid 184 and moving the armature 185 downwardly, as viewed in Fig. 6 of the drawings, to move the selector valve 94 downwardly, Fig. 5, into a position such that it connects the cylinder 56 to the operating port 18, and thus to the brake 162. Consequently, when the anti-skid means 166 is not being used, the selector valve means 90 connects the cylinder 56 to the operating port 18 and the brake 162 so that the pilot senses the actual pressure developed at the brake 162. However, when the anti-skid means 166 is in operation, whereupon the switch 170 is closed, the electromagnet 180 is energized to open the switch 182 controlling the solenoid 184, whereupon the selector valve means 90 connects the cylinder 56 to the accumulator 92 so that the pilot is provided with an artificial "feel" and does not sense the operation of the anti-skid system. Thus, with this arrangement, the cylinder 56 is connected to the accumulator 92 whenever the anti-skid means 166 is in operation, and is connected to the brake 162 when the anti-skid means is inoperative.

Referring to Fig. 7 of the drawings, the system illustrated therein is similar to Fig. 5, the solenoid 184 being controlled through the relay 180, 181, 182 by a pressure switch 188 located between the pump 150 and the pressure port 14, either between the pump 150 and the restrictor 152, as shown in Figs. 2 and 3 of the drawings, or between the restrictor 152 and the pressure port 14, as shown in Fig. 4 of the drawings. As long as the pressure sensed by the pressure switch 188 is above a predetermined value, it is closed to energize the electromagnet 180 and open the switch 182, thereby de-energizing the solenoid 184 and permitting the selector valve means 90 to occupy a position establishing communication between the cylinder 56 and the accumulator 92. Thus, the pilot under these conditions is provided with an artificial "feel" which is not affected by operation of the anti-skid portion of the system. However, if the pressure sensed by the pressure switch 188 falls below the prescribed value, due, for example, to a failure of the pump 150, the electromagnet 180 is de-energized to permit the switch 182 to close, thereby energizing the solenoid 184 and causing the selector valve means 90 to connect the cylinder 56 to the operating port 18 and the brake 162. Consequently, manual braking is achieved under these conditions.

Turning to Figs. 8 and 9 of the drawings, in this instance a selector valve means 190 is connected to the cylinder 56 and to the operating port 18. The selector valve means 190 includes a member 191 providing a selector valve 192 and an actuating means therefor comprising a piston 194, the piston being movable in a cylinder 196 and the selector valve being adapted to engage a valve seat 198 to prevent communication between the cylinder 56 and the operating port 18. The member 191 is biased in a direction to seat the selector valve 192 on the valve seat 198 by a compression spring 200, and the member 191 is provided with an axial passage 202 therethrough.

Considering the operation of the system of Figs. 8 and 9, it will be noted that the fluid pressure existing in the operating port 18, which acts as a remote signal source controlling the selector valve 192, is applied to the lower end of the piston 194 through the axial passage 202, the pressure developed in the cylinder 56 by the piston 58 acting on the upper end of the piston, which is smaller than the lower end thereof. Thus, as long as the pressure in the operating port 18 is above a predetermined value, corresponding to the provision of normal operating fluid pressure to this system by the pump 150, the selector valve 192 will be seated on the valve seat 198 to prevent communication between the cylinder 56 and the operating port 18, and thus prevent communication between the cylinder 56 and the brake 162. Thus, as long as normal operating conditions exist, the pilot is isolated from the anti-skid portion of the system.

However, if the fluid pressure at the operating port 18 drops below a prescribed value for any reason, due, for example, to failure of the pump 150, the pressure developed in the cylinder 56 by the pilot through manual force application to the piston 58 is sufficient to overcome the operating-port pressure acting on the piston 194 in a direction to seat the selector valve 192, whereupon the selector valve is unseated, as shown in Fig. 9, to connect the cylinder 56 to the operating port 18 and to the brake 162 for manual energization of the brake, such manual energization being achieved either with a steady pressure on the brake pedal, or by pumping the brake pedal.

Thus, as long as the pressure at the operating port 18 is above a prescribed value, this system operates as a straight power system, whereas, if such pressure drops below the described value, this system operates as a manual system. It will be understood that while the selector valve means 190 is shown as responsive to operating-port pressure, it may be made responsive to the fluid pressure at some other point in the system, as hereinbefore discussed in connection with the systems of Figs. 2 and 3 and Fig. 4, for example.

It will be noted that the selector valve means 190 illustrated in Figs. 8 and 9 acts as an accumulator in much the same manner as the accumulator 92 previously discussed. In other words, with the conditions obtaining in Fig. 8, if the pilot applies an excessively large braking force to the brake pedal, this is translated into a pressure application to the upper end of the piston 194 which may be sufficient to move this piston downwardly against the action of the spring 200 to provide an accumulator effect. Also, it will be understood that the accumulator 92 may be utilized with the system of Figs. 8 and 9 by connecting it into the cylinder 196 above the piston 194, i.e., between the piston 194 and the valve seat 198.

Although various exemplary embodiments of the present invention have been disclosed herein for purposes of illustration, it will be understood that changes, modifications and substitutions may be incorporated in such embodiments without departing from the spirit of the invention as defined by the claims hereinafter appearing.

We claim as our invention:

1. In a power braking system, the combination of: a reservoir; a pump having its inlet connected to said reservoir; means providing a pressure port connected to the outlet of said pump; means providing an operating port; control valve means movable to an operative position to connect said pressure port to said operating port; cylinder means connectible to said operating port and having therein piston means movable to an operative position to tend to deliver fluid to said operating port; actuating means for moving said control valve means and said piston means toward their said operative positions respectively; a restrictor between said outlet of said pump and said pressure port; a wheel having a brake; dump valve means connected to said operating port, said reservoir and said brake for connecting said brake to either said operating port or said reservoir; means responsive to skidding of said wheel for causing said dump valve means to connect said brake to said reservoir; an accumulator; and selector valve means for connecting said cylinder means to either said operating port or said accumulator.

2. In a power braking system, the combination of: a reservoir; a pump having its inlet connected to said reservoir; means providing a pressure port connected to the outlet of said pump; means providing an operating port; control valve means movable to an operative position to connect said pressure port to said operating port; cylinder means connectible to said operating port and having therein piston means movable to an operative position to tend to deliver fluid to said operating port; actuating means for moving said control valve means and said piston means toward their said operative positions, respectively; a restrictor between said outlet of said pump and said pressure port; a wheel having a brake; dump valve means connected to said operating port, said reservoir and said brake for connecting said brake to either said operating port of said reservoir; means responsive to skidding of said wheel for causing said dump valve means to connect said brake to said reservoir; an accumulator; and selector valve means responsive to a predetermined pressure between said outlet of said pump and said pressure port for disconnecting said cylinder means from said operating port and for connecting said cylinder means to said accumulator.

3. In a power braking system, the combination of: a reservoir; a pump having its inlet connected to said reservoir; a restrictor connected to the outlet of said pump; a control unit having a housing provided with a pressure port connected to said restrictor, a return port connected to said reservoir and an operating port, said control unit including control valve means movable between an inoperative position wherein it connects said operating port to said return port and an operative position wherein it connects said operating port to said pressure port, said control unit including cylinder means connectible to said operating port and having therein piston means movable to an operative position to tend to deliver fluid to said operating port, said control unit including actuating means for moving said control valve means and said piston means toward their said operative positions, respectively, said control unit including an accumulator, and said control unit including selector valve means for connecting said cylinder means to either said operating port or said accumulator; a wheel having a brake; dump valve means connected to said operating port, said reservoir and said brake for connecting said brake to either said operating port or said reservoir; means responsive to skidding of said wheel for causing said dump valve means to connect said brake to said reservoir; and means for causing said selector valve means to disconnect said cylinder means from said operating port and to connect it to said accumulator.

4. In a power braking system, the combination of: a reservoir; a pump having its inlet connected to said reservoir; a restrictor connected to the output of said pump; a control unit having a housing provided with a pressure port connected to said restrictor, a return port connected to said reservoir and an operating port, said control unit including control valve means movable between an inoperative position wherein it connects said operating port to said return port and an operative position wherein it connects said operating port to said pressure port, said control unit including cylinder means connectible to said operating port and having therein piston means movable to an operative position to tend to deliver fluid to said operating port, said control unit including actuating means for moving said control valve means and said piston means toward their said operative positions, respectively, said control unit including an accumulator, and said control unit including selector valve means for connecting said cylinder means to either said operating port or said accumulator; a wheel having a brake; dump valve means connected to said operating port, said reservoir and said brake for connecting said brake to either said operating port or said reservoir; means responsive to skidding of said wheel for causing said dump valve means to connect said brake to said reservoir; and means responsive to a predetermined fluid pressure between said outlet of said pump and said pressure port for causing said selector valve means to disconnect said cylinder means from said operating port and to connect it to said accumulator.

5. In a control unit, the combination of: a housing provided with a pressure port connectible to a source of fluid pressure, a return port connectible to a point of disposal for spent fluid, and an operating port connectible to a device to be controlled; control valve means in said housing movable between an inoperative position wherein it connects said operating port to said return port and an operative position wherein it connects said operating port to said pressure port; cylinder means connectible to said operating port; piston means in said cylinder means and movable therein to an operative position to tend to deliver fluid to said operating port; actuating means connected to said control valve means and said piston means for moving said control valve means and said piston means toward their said operative positions, respectively; an accumulator; and selector valve means for connecting said cylinder means to said operating port or said accumulator.

6. In a control unit, the combination of: a housing provided with a pressure port connectible to a source of fluid pressure, a return port connectible to a point of disposal for spent fluid, and an operating port connectible to a device to be controlled; control valve means in said housing movable between an inoperative position wherein it connects said operating port to said return port and an operative position wherein it connects said operating port to said pressure port; cylinder means in said housing and connectible to said operating port; piston means in said cylinder means and movable therein to an operative position to tend to deliver fluid to said operating port; actuating means carried by said housing and connected to said control valve means and said piston means for moving said control valve means and said piston means toward their said operative positions, respectively; an accumulator in said housing; and selector valve means in said housing for connecting said cylinder means to either said operating port or said accumulator.

7. A control unit as defined in claim 5 wherein said selector valve means is fluid operated and includes a selector valve and a piston connected thereto.

8. A control unit as defined in claim 5 wherein said selector valve means is electrically operated and includes a selector valve having an electromagnet armature connected thereto.

9. A control unit as defined in claim 6 wherein said selector valve means is fluid operated and includes a selector valve and a piston connected thereto.

10. A control unit as defined in claim 6 wherein said selector valve means is electrically operated and includes a selector valve having an electromagnet armature connected thereto.

11. A control unit as defined in claim 6 wherein said accumulator includes a cylinder having a piston therein and includes a spring for biasing said piston toward one end of said cylinder, said housing having therein a flow passage controlled by said selector valve means and connecting said one end of said cylinder to said cylinder means.

References Cited in the file of this patent

UNITED STATES PATENTS

| | | |
|---|---|---|
| 2,493,377 | Zeilman | Jan. 3, 1950 |

FOREIGN PATENTS

| | | |
|---|---|---|
| 704,925 | Great Britain | Mar. 3, 1954 |
| 185,016 | Switzerland | Sept. 16, 1936 |

UNITED STATES PATENT OFFICE

CERTIFICATION OF CORRECTION

Patent No. 2,959,450     November 8, 1960

John N. Gladden et al.

It is hereby certified that error appears in the above numbered patent requiring correction and that the said Letters Patent should read as corrected below.

Column 1, line 39, for "the", second occurrence, read -- their --; line 43, for "is" read -- in --; lines 50 and 51, for "herein before" read -- hereinbefore --; column 2, line 22, for "The" read -- This --; column 7, line 57, after "pressure" insert -- in the pressure --; column 13, line 20, for "output" read -- outlet --.

Signed and sealed this 9th day of May 1961.

(SEAL)

Attest:
ERNEST W. SWIDER
Attesting Officer

DAVID L. LADD
Commissioner of Patents